United States Patent
Li et al.

(10) Patent No.: US 8,948,550 B2
(45) Date of Patent: Feb. 3, 2015

(54) SENSING SYSTEMS AND FEW-MODE OPTICAL FIBER FOR USE IN SUCH SYSTEMS

(75) Inventors: Ming-Jun Li, Horseheads, NY (US); Shenping Li, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 372 days.

(21) Appl. No.: 13/401,239

(22) Filed: Feb. 21, 2012

(65) Prior Publication Data

US 2013/0216176 A1    Aug. 22, 2013

(51) Int. Cl.
*G02B 6/12*    (2006.01)

(52) U.S. Cl.
USPC .......................................................... 385/12

(58) Field of Classification Search
CPC ............................................. G02B 2006/12138
USPC .......................................................... 385/12
See application file for complete search history.

(56) References Cited

U.S. PATENT DOCUMENTS

| | | | |
|---|---|---|---|
| 5,330,136 A | | 7/1994 | Colbaugh |
| 5,991,479 A | * | 11/1999 | Kleinerman ................ 385/31 |
| 6,515,123 B2 | | 2/2003 | Kaul et al. |
| 6,728,444 B2 | * | 4/2004 | Brennan et al. ............. 385/37 |
| 6,839,484 B2 | | 1/2005 | White |
| 7,113,659 B2 | | 9/2006 | Taverner |
| 7,245,790 B2 | | 7/2007 | Brown et al. |
| 7,355,163 B2 | | 4/2008 | Watley et al. |
| 7,529,434 B2 | | 5/2009 | Taverner et al. |
| 7,576,840 B2 | * | 8/2009 | Yamamoto ................ 356/35.5 |
| 7,693,358 B2 | * | 4/2010 | Kashiwagi ................... 385/12 |
| 8,077,314 B2 | * | 12/2011 | Davies et al. ................ 356/344 |
| 8,270,782 B2 | * | 9/2012 | Lee ............................ 385/12 |
| 8,520,986 B2 | * | 8/2013 | Dailey ........................ 385/12 |
| 8,538,207 B2 | * | 9/2013 | Gates et al. ................. 385/14 |
| 8,611,703 B2 | * | 12/2013 | Zhou et al. .................. 385/12 |
| 2002/0164140 A1 | | 11/2002 | Lysiansky et al. |
| 2008/0253428 A1 | | 10/2008 | MacDougall et al. |
| 2012/0274926 A1 | | 11/2012 | Li et al. |
| 2012/0274927 A1 | | 11/2012 | Li et al. |

FOREIGN PATENT DOCUMENTS

| | | |
|---|---|---|
| CN | 101839759 | 9/2010 |
| EP | 0951641 | 4/2002 |

(Continued)

OTHER PUBLICATIONS

May 28, 2013 International Search Report and Written Opinion issued in counterpart application PCT/US2013/026825.

(Continued)

*Primary Examiner* — Charlie Peng
*Assistant Examiner* — Mary El Shammaa
(74) *Attorney, Agent, or Firm* — Svetlana Short (57) ABSTRACT

A sensing optical fiber comprising: a few-moded multi-segment core, said core comprising one core segment surrounded by another core segment, and at least one cladding surrounding said core; said core having an F factor ($\mu m^2$) of 100 $\mu m^2$ to 350 $\mu m^2$, and is constructed to provide (i) an overlap integral between the fundamental optical guided mode and the fundamental acoustic guided mode of greater than 0.7 and (ii) the overlap integral between the LP11 optical guided mode and the fundamental acoustic guided mode at least 0.45.

20 Claims, 7 Drawing Sheets

(56) References Cited

FOREIGN PATENT DOCUMENTS

| WO | WO2008056143 | 5/2008 |
|----|--------------|--------|
| WO | WO2010085605 | 7/2010 |

OTHER PUBLICATIONS

Bao, X et al., "Recent Progress in Brillouin Scattering Based Fiber Sensors", Sensors, vol. 11, No. 12, Dec. 7, 2011, pp. 4152-4187.

Iezzi, V L et al., "Stimulated Brillouin Scattering in Multi-Mode Fiber for Sensing Applications", Fibre and Optical Passive Components, 2011 7th Workshop on, IEEE, Jul. 13, 2011, p. 1-4.

Hong-Liang, L et al., "Acoustic longitudinal mode coupling in w-shaped al/Ge Co-doped fibre", Chinese Physics B, Bristol GB, vol. 20, No. 10, Oct. 7, 2011, pp. 104211-1 to 104211-9.

Luc Thevenaz, "Brillouin distributed time-domain sensing in optical fibers: state of the art and perspectives", Front. Optoelectron. China 2010, 3(1), 13-21.

T. Horiguchi, et al, "Development of a Distributed Sensing Technique Using Brillouin Scattering", J. Lightwave Tech., vol. 13, No. 7, pp. 1296-1302 (Jul. 1995).

A. Fellay, et al., "Distributed sensing using stimulated Brillouin scattering: Towards ultimate resolution", in Proc. OSA Tech. Dig., vol. 16, 324-327 (1997).

M. D. DeMerchant, et al., "Automated system for distributed sensing", Proc. SPIE, vol. 3330, pp. 315-322 (SanDiego, CA; Mar. 1998).

K. Song and H. Yoon, "High-resolution Brillouin Optical Time Domain Analysis Based on Brillouin Dynamic Grating", Optics Letters vol. 35, No. 1, pp. 52-54 (Jan. 1, 2010).

Liu, Y, et al., "Single-mode dispersion-shifted fibers with effective area over 100 $\mu m^2$", European Conference on Optical Communication, ECOC, vol. 1, p. 41-42 (Sep. 20-24, 1998, Madrid, Spain).

R.S. Romaniuk, "Basic properties of ring-index optical fibers", Proceedings of the SPIE, vol. 5028, pp. 19-25, 2003.

S. Matsuo, et al., "New medium-dispersion fiber with large effective area and low dispersion slope", Conference on Optical Fiber Communication, Technical Digest Series, v 70, p. 329-330 (Mar. 20, 2002).

R.H. Stolen, "Modes in Fiber Optical Waveguides With Ring Index Profiles", Applied Optics, vol. 14, No. 7, pp. 1533-1537 (Jul. 1975).

X. Bao, et al, "Experimental and Theoretical Studies on a Distributed Temperature Sensor Based on Brillouin Scattering". J. Lightwave Tech., vol. 13, No. 7, pp. 1340-1348 (Jul. 1995).

* cited by examiner

SENSING SYSTEMS AND FEW-MODE OPTICAL FIBER FOR USE IN SUCH SYSTEMS

FIELD

The disclosure generally relates to sensing systems and in particular relates to distributed Brillouin sensing systems, and a few-mode sensing optical fiber for use in such systems.

BACKGROUND

Distributed sensors based on Brillouin scattering are attractive for forming optical fiber sensing systems used to measure the structural integrity of buildings, bridges, tunnels, dams and pipelines, as well as ships and airplanes. The most popular Brillouin optical fiber sensing system is Brillouin Optical Time Domain Reflectometry (BOTDR). This technique is very similar to Rayleigh-based OTDR, where spontaneous Brillouin light backscattered from an intense pulse is recorded as a function of time. The frequency distribution of the backscattered signal is measured for each time step to determine a strain or a temperature change at each location. Like a conventional OTDR, a BOTDR requires access to a single fiber end only, which is convenient for many applications. However, the spatial resolution of BOTDR is practically limited to 1 m.

Another optical fiber sensing system utilizes Brillouin Optical Time Domain Analysis (BOTDA). This technique takes advantage of the Stimulated Brillouin Scattering (SBS) based on a pump-probe technique wherein an intense pump pulse interacts locally during its propagation with a weak counter-propagated continuous-wave (CW) probe. The gain experienced by the probe at each location can be analyzed by recording the probe amplitude in the time domain. The frequency difference between the pump and the probe is scanned step-by-step, and the local amplification can be retrieved for a given pump-probe frequency difference. The local gain spectrum can then be reconstructed by analyzing the gain at a given location as a function of frequency. BOTDA requires access to both optical fiber ends since the pump pulse and CW probe must counter-propagate in the sensing fiber, which is a limitation in some situations. BOTDA is subject to the similar spatial resolution limitation as BOTDR, i.e., about 1 m, because of 1) the tradeoff between spatial resolution and sensing sensitivity, and 2) the significant broadening and lowering of the Brillouin gain spectrum as the pulse width is reduced to the values comparable with the acoustic relaxation time (~10 ns).

To improve the spatial resolution, the use of a Brillouin Dynamic Grating (BDG) formed in a polarization-maintaining single-mode optical fiber has been proposed. In this approach, an acoustic wave is generated in one polarization by a pump and is used to reflect an orthogonally polarized probe at a different optical frequency from the pump. An experiment result was reported wherein a distributed strain is measured with a 10 cm spatial resolution in a 105 m of polarization-maintaining single-mode optical fiber. However, polarization-maintaining single-mode optical fibers typically have higher attenuation and are more expensive than standard optical fibers. In addition, the sensing schemes required for a polarization-maintaining optical single-mode fiber system require polarization-maintaining components that add additional cost and complexity to the sensing systems. Furthermore, it is difficult to maintain a given polarization over a long fiber (i.e., a few km or longer), which limits the sensor system length.

There is therefore a need for low-cost optical fiber sensing systems with improved spatial resolution, and fibers for use with such systems

SUMMARY

An embodiment of the disclosure is a sensing optical fiber comprising: a few-moded multi-segment core, and at least one cladding surrounding the core. The core is constructed to having an F factor of 100 $\mu m^2$ to 350 $\mu m^2$, and to provide (i) an overlap integral between the fundamental optical guided mode and the fundamental acoustic guided mode of greater than 0.7 and (ii) the overlap between the LP11 optical guided mode and the fundamental acoustic guided mode at least 0.45. Preferably the core radius is 4 $\mu m$ to 20 $\mu m$ and the overlap integral between the LP11 optical guided mode and the fundamental acoustic guided mode L01 is at least 0.45, more preferably at least 0.5. In some exemplary embodiments the overlap integral between the LP11 optical guided mode and the fundamental acoustic guided mode at least 0.6.

In some embodiments the effective area optical of the sensing fiber is Aeff at least 100 $\mu m^2$, in some embodiments at least 120 $\mu m^2$, and in some embodiments 150 $\mu m^2$ or greater at 1550 nm for the LP01 optical mode. In some embodiments the sensing fiber has at least two core segments and the difference between the refractive index deltas of the two core segments is $\Delta_2-\Delta_1>0.05$. In some embodiments is the difference between the refractive index deltas of the two core segments is at least 0.15%. In some embodiments the overlap integral between the LP11 optical guided mode and L01 acoustic mode is greater than 0.7, and preferably greater than 0.8.

One embodiment is a distributed Brillouin optical fiber sensing system. The system includes a sensing optical fiber configured to support a fundamental guided mode and at least one higher-order guided mode. The sensing fiber an is constructed to have: (i) an overlap integral between the fundamental optical guided mode and the fundamental acoustic guided mode of greater than 0.7 and (ii) the overlap between the LP11 optical guided mode and the fundamental acoustic guided mode at least 0.45. The system includes a pump light source configured to introduce pump light into one of the guided modes to define a pump light guided mode. The pump light forms a Brillouin dynamic grating (BDG) within the sensing optical fiber. The system also has a probe light source that is configured to introduce input probe light into one or more of the guided modes other than the pump light guided mode to create reflected probe light from the BDG. The reflected probe light and the input probe light are shifted in frequency relative to each other by a Brillouin frequency shift. The system also includes a receiver optically coupled to the sensing optical fiber. The receiver is configured to detect the reflected probe light to determine a Brillouin frequency shift and the reflection location, and in an example is or includes an optical spectral analyzer.

Another embodiment of the disclosure is a distributed Brillouin optical fiber sensing system. The system has a sensing optical fiber configured to support at least first and second guided modes. The sensing fiber an is constructed to have: (i) an overlap integral between the fundamental optical guided mode and the fundamental acoustic guided mode of greater than 0.7 and (ii) the overlap between the LP11 optical guided mode and the fundamental acoustic guided mode at least 0.45. The sensing optical fiber is not a polarization-maintaining fiber. The system also includes a first pump light source optically coupled to the sensing optical fiber. The first pump light source is configured to generate first pump light that travels in the sensing optical fiber in the first guided mode and forms a BDG that contains information of a local Brillouin frequency of the sensing optical fiber. The system also includes a probe light source optically coupled to the sensing optical fiber. The probe light source is configured to generate pulsed probe light that travels in the sensing optical fiber in the second guided mode. The pulsed probe light has a wavelength selected so that at least a portion of the pulsed probe light reflects from the Brillouin dynamic grating and includes information about the local Brillouin frequency. The system also has a receiver optically coupled to the sensing optical fiber and configured to receive the reflected probe light and to determine the local Brillouin frequency and the reflection location, and thus at least one condition along the sensing optical fiber.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference is now be made in detail to embodiments of the disclosure, examples of which are illustrated in the accompanying drawings. Whenever possible, like reference numbers are used to refer to like components or parts. Cartesian coordinates are shown in some of the Figures by way of reference.

In the discussion below and in the claims, reference to a "first guided mode" and a "second guided mode" does not necessarily refer to the lowest order and first-order guided modes respectively, but rather is more generally intended to refer to different ones of the available guided modes.

Also in the discussion below, the following definitions and terminology as commonly used in the art are employed.

Refractive index profile: the refractive index profile is the relationship between the relative refractive index percent ($\Delta\%$) and the optical fiber radius r (as measured from the centerline of the optical fiber) over a selected segment of the fiber.

Relative refractive index percent $\Delta(\%)$ or $\Delta$: the term $\Delta$ represents a relative measure of refractive index defined by the equation: $\Delta(\%)=100\times(n_m^2-n_r^2)/2n_i^2$ where $n_m$ is the maximum refractive index of the index profile segment denoted as m, and $n_r$ is the reference refractive index (e.g., cladding). Every point in the segment has an associated relative refractive index measured relative to the reference refractive index.

Figure 1A:
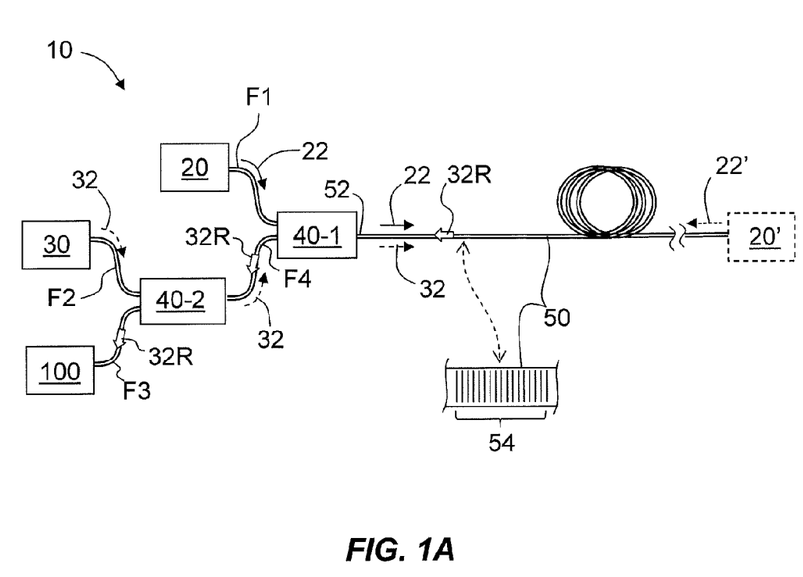
FIG. 1A is a schematic diagram of an example embodiment of a distributed Brillouin sensing system according to the disclosure.

FIG. 1A is a schematic diagram of an example embodiment of a distributed Brillouin sensing system ("system") 10 according to the disclosure. System 10 includes a pump light source 20 that generates pump light 22 of wavelength $\lambda 1$ (frequency v1) and a probe light source 30 that generates probe light 32 of tunable wavelength $\lambda 2$ (tunable frequency v2). System 10 also includes a "few guided mode" sensing optical fiber 50 that supports at least first and second guided modes. In an example, sensing optical fiber 50 is non-polarization-maintaining. Sensing optical fiber 50 has an input/output end 52. Pump light source 20 and probe light source 30 are optically coupled to sensing optical fiber 50 at input/output end 52. System 10 also includes a receiver 100 optically coupled to input/output end 52. In an example, receiver 100 includes a digital signal processor operably connected to a balanced coherent detector formed by a 50:50 optical coupler and a balanced photodetector. An example receiver 100 is discussed in greater detail below.

In an example, the optical coupling to sensing optical fiber input/output end 52 of pump and probe light sources 20 and 30 and receiver 100 is accomplished using different sections of multimode optical fiber F and multimode 1×2 50:50 fiber-optic couplers 40. In an embodiment, the multimode optical fiber F and the multimode couplers 40 are made of the same few mode fiber as the sensing fiber to minimize the insertion loss. Thus, in one embodiment, pump light source 20 is optically coupled to a first optical coupler 40-1 via a first optical fiber section F1, while probe light source 30 and receiver 100 are respectively optically coupled to a second optical coupler 40-2 via respective optical fiber sections F2 and F3. Second optical coupler 40-2 is optically coupled to first optical coupler 40-1 via a fourth optical fiber section F4. First fiber optic coupler 40-1 is also optically coupled to sensing optical fiber input/output end 52.

Figure 2A:
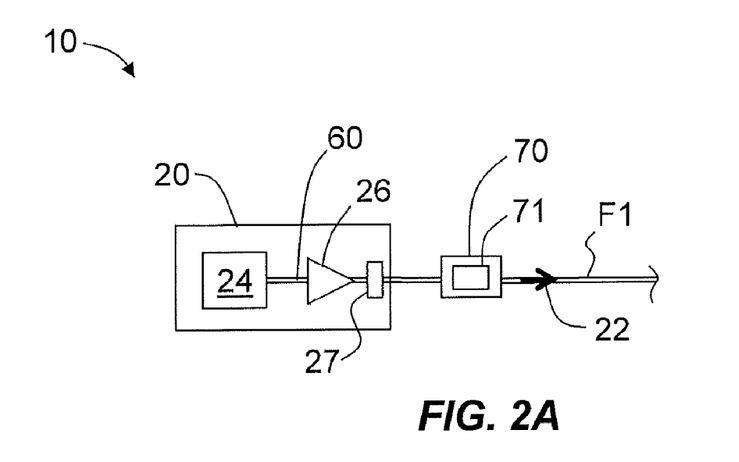
FIG. 2A and FIG. 2B are schematic diagrams that illustrate example embodiments of the pump light source (FIG. 2A) and the probe light source (FIG. 2B)

In an example, pump light source 20 comprises a narrow-linewidth laser. FIG. 2A is a schematic diagram that illustrates an example embodiment of pump light source 20 that includes a fiber laser 24 that employs a suitable configured single-mode fiber 60 and an optical fiber amplifier 26. The wavelength λ1 of pump light 22 can be in the range of 500 to 1600 nm. In various embodiments, the pump light wavelength is greater than 800 nm, is greater than 1000 nm, is greater than 1300 nm, and is in the wavelength range of 1500 nm to 1600 nm, where optical fiber loss is generally at a minimum. In an example, pump light source 20 includes a tunable filter 27 to filter the spontaneous emission outside the pump wavelength bandwidth.

FIG. 2A illustrates an example where single-mode fiber 60 is optically coupled to multimode optical fiber section F1 using a coupling member 70. In an example, the coupling member 70 is a simple splice to excite the fundamental mode in optical fiber F1. In another example, coupling member 70 contains a mode-selection or "mode converter" 71 configured to launch a specific mode in optical fiber section F1. Mode converter 71 may include a free-space based element, such as phase plate, or a fiber-based element, such as long-period fiber grating, e.g., a tilted fiber Bragg grating.

Different types of lasers can be used as pump lasers for pump light source 20, including semiconductor lasers and fiber lasers, as shown in FIG. 2A. In an example, pump light source 20 comprises a CW source, i.e., generates CW pump light 22. In another example, pump light source 20 generates pulsed pump light 22. If a pulsed pump light source 20 is used, then in various embodiments the pulse width is greater than 10 ns, greater than 100 ns, and greater than 1000 ns.

Figure 2B:
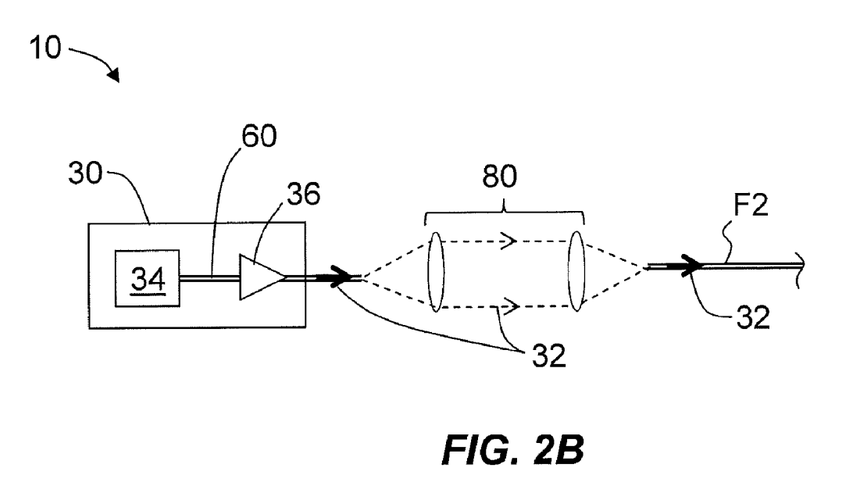

In an example, probe light source 30 comprises a laser, for example a narrow-linewidth tunable laser 34. FIG. 2B is similar to FIG. 2A and illustrates an example embodiment of probe light source 30 that includes a tunable fiber laser 34 based on a suitably configured single-mode optical fiber 60, and an optical fiber amplifier 36. In an example, probe light source 30 is optically coupled to a multimode optical fiber section F2 using a free-space optical connection, e.g., via a light-coupling optical system 80. This configuration allows for a select guided mode of sensing optical fiber 50 to be used to support probe light 32. In another example, a long-period grating (e.g., a tilted fiber Bragg grating) based optical mode converter is used to convert the fundamental mode to a selected higher order mode. Probe light 32 can be referred to as "input probe light" to distinguish from reflected probe light 32R.

Figure 1B:
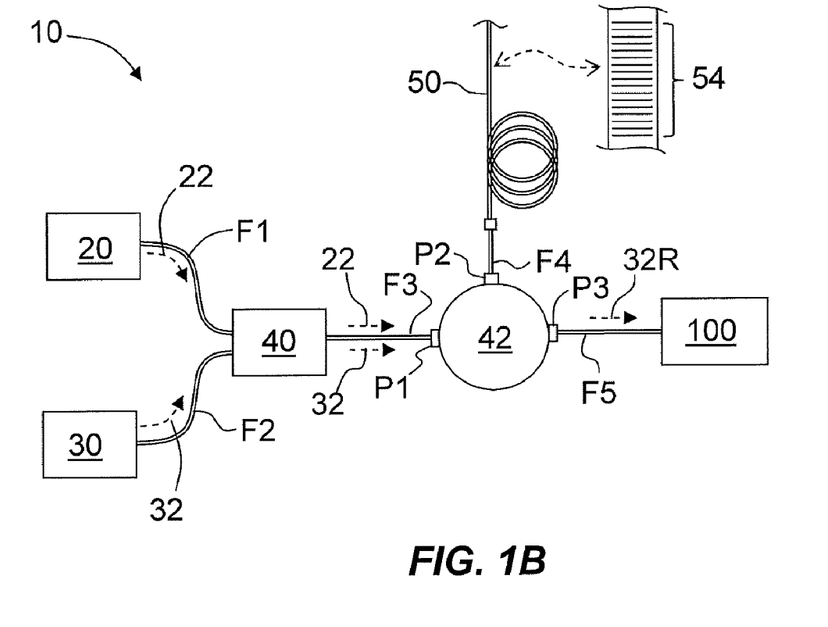
FIG. 1B is a schematic diagram of another example embodiment of a distributed Brillouin sensing system according to the disclosure.

FIG. 1B is similar to FIG. 1A and illustrates another example embodiment of system 10. In system 10 of FIG. 1B, pump and probe light sources 20 and 30 are respectively optically coupled to an optical coupler 40 via fiber sections F1 and F2. Optical coupler 40 in turn is optically coupled via optical fiber section F3 to a port P1 of an optical circulator 42 having three ports P1, P2 and P3. An optical fiber section F4 optically connects port P2 to input/output end 52 of sensing optical fiber 50. An optical fiber section F5 optically connects port P3 to receiver 100. This configuration of system 10 allows pump light 22 and probe light 32 to be combined at optical coupler 40 and then directed to sensing optical fiber 50 via optical fiber sections F3 and F4 via circulator 42. The reflected probe light 32R is then directed from the input/output end 52 of sensing optical fiber 50 to receiver 100 via optical fiber sections F4 and F5 via circulator 42.

Figure 3A:
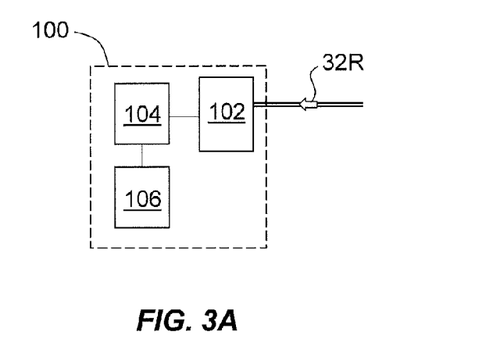
FIG. 3A is a schematic diagram of an example receiver for the system of FIG. 1.

With reference again to FIG. 1A and FIG. 1B, and also to FIG. 3A, in an example embodiment receiver 100 includes a multi-frequency (multi-wavelength) photodetector unit 102 operably coupled to a processor unit ("processor") 104. Receiver 100 also includes a memory unit ("memory") 106. In an example embodiment, receiver 100 comprises an optical spectral analyzer.

Figure 3B:
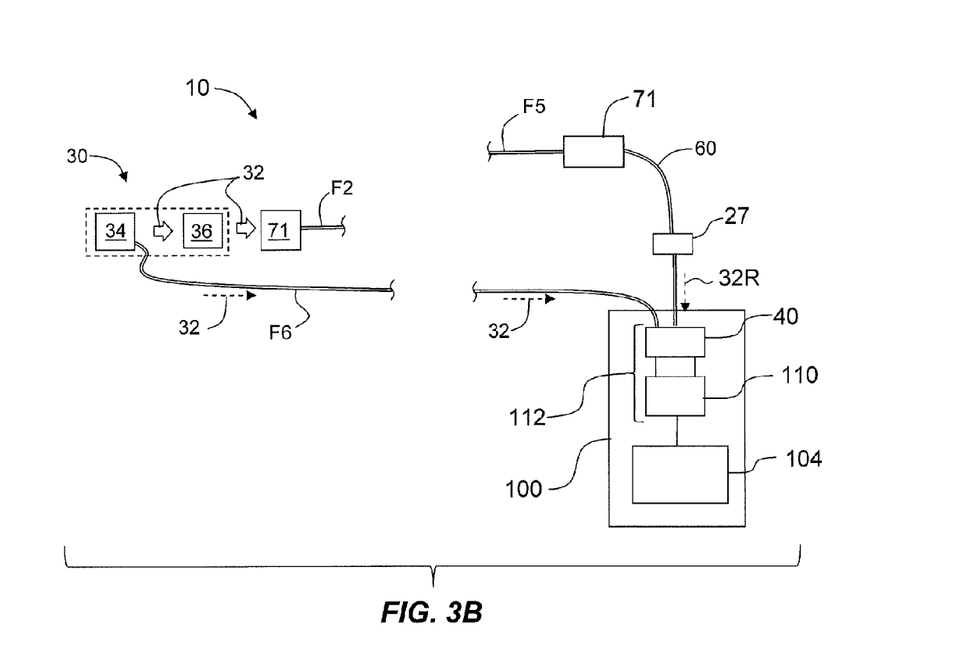
FIG. 3B is a schematic diagram of example probe light source and receiver portions of the system configuration illustrated in FIG. 1B.

FIG. 3B is a close-up view of an example receiver portion and an example probe light source portion of system 10. Receiver 100 is shown as including processor 104 configured as a digital signal processor, and also includes a balanced coherent detector 112 formed by a 50:50 optical coupler 40 and a balanced photodetector 110. The optical coupler 40 is optically connected to single-mode optical fiber section 60 that includes a tunable filter 27 and is optically connected to an optical fiber section F6 that is optically coupled to tunable laser 34 in probe light source 30. This configuration defines a local oscillator to generate the reference light (i.e., a portion of probe light 32) for balanced coherent detector 112.

Probe light source 30 is shown by way of example to include an optical modulator 36 that serves to optically modulate CW probe light 32 from CW tunable laser 34 to generate pulsed probe light prior to the probe light being coupled into optical fiber section F2 via a mode converter 71, which serves to introduce a select mode into the optical fiber section F2.

Mode converter 71 residing between (multimode) optical fiber section F5 and single-mode optical fiber section 60 serves to convert reflected probe light 32R from the LP11 guided mode into the LP01 guided mode if the reflected probe light is in the LP11 guided mode in sensing optical fiber 50. This mode converter is not needed if the probe light is already in the LP01 guide mode in sensing optical fiber 50. The narrow-bandwidth filter 27 is used to pass only reflected probe light 32R and to filter out all other reflected light.

In the general operation of system 10 as shown in FIG. 1A, pump light 22 generated by pump light source 20 travels through first optical fiber section F1 to first optical coupler 40-1 and into sensing optical fiber 50 at input/output end 52. Pump light 22 then travels within sensing optical fiber 50 in only one of the guided modes.

Figure 4A:
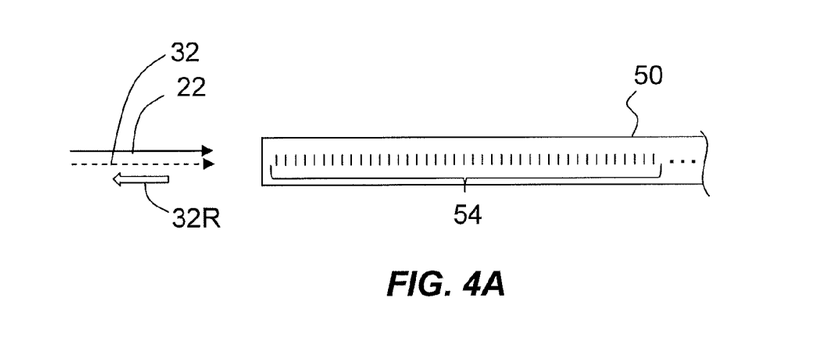
FIG. 4A is a schematic diagram of the input/output end of the sensing optical fiber, illustrating an example configuration for the pump light, the probe light, the reflected probe light and the BDG formed in the sensing optical via SBS of the pump light.

With reference now also to FIG. 4A, in this embodiment, when the power of pump light 22 reaches the stimulated Brillouin scattering (SBS) threshold, a Brillouin dynamic grating (BDG) 54 and a Stokes (SBS) wave (not shown) are generated in sensing optical fiber 50. The frequency of the SBS wave is down-shifted from that of the pump light frequency $v_1$. The frequency difference between the pump light and SBS wave is called the Brillouin frequency shift $v_B$, which depends on properties of sensing optical fiber 50 and the optical and acoustic guided modes.

If pump light 22 is transmitted in sensing optical fiber 50 in a guided mode i and the exited acoustic wave is in acoustic guided mode m, the Brillouin frequency shift is given by $$v_B = \frac{2n_i V_m}{\lambda_1} \quad (1)$$

and the corresponding wavelength shift is:

$$\Delta \lambda_B = -v_B \frac{\lambda_1^2}{c} \quad (1a)$$

where $\lambda_1$ is the optical wavelength of the pump, $n_i$ is the effective refractive index of the optical guided mode of order i, and $V_m$ is the effective acoustic velocity of the acoustic guided mode of order m. If short-pulse probe light 32 of frequency $v_2$ is sent though guided mode j (i.e., a guided mode different than that of the pump light 22), a signal of frequency $v_2$-$v_B$ is reflected by BDG 54 if the phase-matching conditions are satisfied, i.e., if the frequency change between the probe and the pump is:

$$\Delta v = \frac{\Delta n_{ij}}{n_i} v_1 \quad (2)$$

and the corresponding wavelength shift is:

$$\Delta \lambda = -\Delta v \frac{\lambda_1^2}{c} \quad (2a)$$

where $\Delta n_{ij} = n_i - n_j$ is the difference in effective index between optical (guided) guided modes i and j.

Figure 4B:
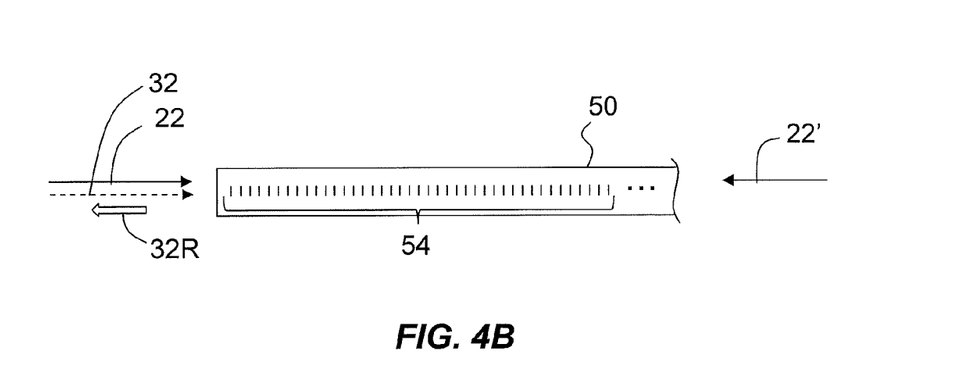
FIG. 4B is similar to FIG. 4A and further illustrates an example configuration where first and second pump light traveling in opposite directions in the sensing optical fiber is employed.

FIG. 4B is similar to FIG. 4A and schematically illustrates another embodiment system 10 that utilizes a second pump light source 20', shown in phantom in FIG. 1A. In this embodiment, a narrow-linewidth pump light 22 at frequency $v_1$ (wavelength $\lambda_1$) from pump light source 20 and narrow-linewidth pump light 22' at frequency $v'_1$ (wavelength $\lambda'_1$) from pump light source 20' are counter-propagated in sensing optical fiber 50 to generate BDG 54. The pump light wavelengths can be in the range of 500 nm to 1600 nm. In various embodiments, the wavelength is greater than 800 nm, greater than 1000 nm, greater than 1300 nm, and in the wavelength range of 1500 nm to 1600 nm, where fiber loss is generally at a minimum.

When the frequency difference ($v_1 - v'_1$) matches the Brillouin frequency shift $v_B$, BDG 54 is generated in sensing optical fiber 50. As in the single-pump-light embodiment, the Brillouin frequency shift $v_B$ depends on the optical fiber properties of sensing optical fiber 50 and the optical and acoustic guided modes. If pump light 22 and pump light 22' are transmitted through an optical guided mode i and the exited acoustic wave is in acoustic guided mode m, the Brillouin frequency shift $v_B$ and the corresponding wavelength shift are given by Equations 1 and 1a, above.

If probe light 32 of frequency $v_2$ is sent through an optical guided mode j propagating in the same direction as pump light 22, a signal of $v_2 - v_B$ is reflected by BDG 54 if the phase-matching conditions are satisfied, i.e., if the frequency change between the probe light 32 and the pump light 22 satisfies Equation 2, or the wavelength change between the probe light 32 and pump light 22 satisfies Equation 2a.

In both embodiments, a stable BDG 54 can be formed by a narrowband Brillouin gain (also a narrowband BDG), which can be localized and scanned along sensing optical fiber 50 in the time domain by a broadband, short-pulse probe light 32 having a nanosecond pulse width and supported by a different guided mode than the pump light 22.

It is noted here that the embodiments of system 10 as illustrated in FIG. 1A and FIG. 1B are exemplary embodiments that illustrate the general principles of operation of the system, and that other embodiments that achieve the same functionality as the illustrated embodiments can be configured.

Pump Light and Probe Light Supported by Different Guided Modes

Figure 5A:
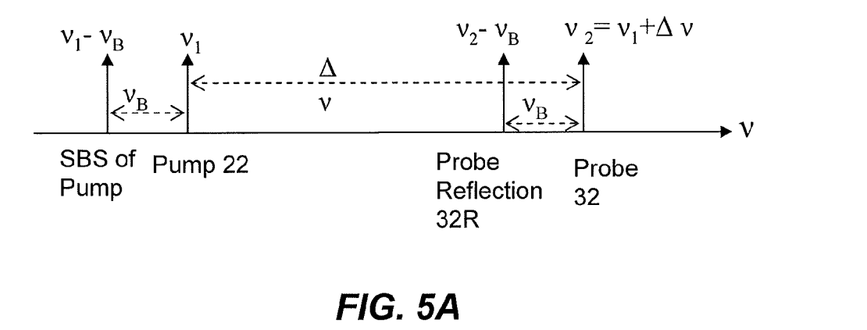
FIG. 5A is a frequency spectrum that shows the relative frequencies involved in the sensing process when the pump light is supported by a guided mode having a lower order than the guided mode for the probe light.

An embodiment of the disclosure is that pump light 22 travels in a different guided mode than probe light 32. In one example, pump light 22 is supported by a guided mode of lower order than that of probe light 32, and this guided mode can be called the pump light guided mode. FIG. 5A is a frequency spectrum that shows the relative frequencies involved in the sensing process when pump light 22 is supported by a guided mode having a lower order than the guided mode for the probe light 32.

Figure 5B:
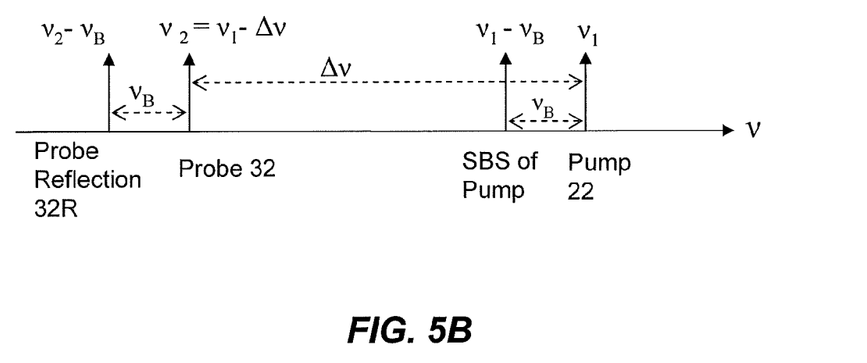
FIG. 5B is similar to FIG. 5A and shows the relative frequencies involved in the sensing process when the pump light is supported by a guided mode having a higher order than the guided mode for the probe light.

In another example, pump light 22 is supported by a guided mode of higher order than that of probe light 32. FIG. 5B is similar to FIG. 5A and shows the relative frequencies involved in the sensing process when the pump light 22 is supported by a guided mode having a higher order than the guided mode for the probe light.

In an example, pump light 22 is supported by a single guided mode, and probe light 32 is supported by multiple other guided modes besides the pump light guided mode.

BDG 54 is temperature and strain dependent as a result of the thermal expansion and deformation experienced by sensing optical fiber 50. Thus, the peak frequency of the reflected probe light 32R changes with temperature and strain, namely:

$$v_B(T) = C_T T + v_{B0} \quad (3)$$

$$v_B(\epsilon) = C_\epsilon T + v_{B0} \quad (4)$$

where $C_T$ is the temperature coefficient in MHz/° C., T is the temperature in ° C., $v_{B0}$ is the reference Brillouin frequency, $C_\epsilon$ is the strain coefficient in MHz/µε, and ε is the strain. For a Therefore, temperature and strain at different locations along sensing optical fiber 50 can be evaluated using BDG 54 by determining the frequency difference between probe light 32 and the reflected probe light 32R. Because of the narrow spectral bandwidth of BDG 54, high-resolution sensing can be achieved. Meanwhile, since probe light 32 can have a relatively short pulse width, a high spatial resolution is obtained.

Simultaneous Measurement of Strain and Temperature

As described above, BDG 54 is temperature and strain dependent as a result of the thermal expansion and deformation experienced by sensing optical fiber 50. Thus, the peak frequency change of the reflected probe light 32R (or the change of Brillouin frequency shift) changes with temperature variation (δT) and strain variation (βε) can be also described by $$\delta v_B = K_v^\epsilon \delta\epsilon + K_v^T \delta T \quad (3A)$$

where $K_v^T$ is the temperature coefficient, T is the temperature in ° C., $K_v^\epsilon$ is the strain coefficient, and ε is the strain.

Because effective refractive index difference between the two fiber modes of few-mode fiber (FMF) can change with strain and temperature, the wavelength difference between pump and probe is relative to strain and temperature too. The change of the wavelength difference between pump and probe ($\Delta\lambda = \lambda_1 - \lambda_2$) (which is also referred to herein as wavelength separation between pump and probe lights) with strain variation (δε) and temperature variation (δT) can be expressed as $$\delta(\Delta\lambda) = K_\lambda^\epsilon \delta\epsilon + K_\lambda^T \delta T \quad (4A)$$

where $K_\lambda^\epsilon$ and $K_\lambda^T$ are the strain and temperature coefficients for the wavelength difference between pump and probe. By solving equations (3A) and (4A), the strain variation and temperature variation are given by $$\begin{bmatrix} \delta\epsilon \\ \delta T \end{bmatrix} = \frac{1}{K_\lambda^\epsilon K_v^T - K_\lambda^T K_v^\epsilon} \begin{bmatrix} K_v^T & -K_\lambda^T \\ -K_v^\epsilon & K_\lambda^\epsilon \end{bmatrix} \begin{bmatrix} \delta(\Delta\lambda) \\ \delta v_B \end{bmatrix} \quad (4B)$$

If $K_\lambda^\epsilon K_v^T \neq K_\lambda^T K_v^\epsilon$, then a solution exists for the matrix equation (4B). Thus, simultaneous distributed strain and temperature measurement can be achieved.

Therefore, temperature and strain at different locations along sensing optical fiber 50 can be evaluated using BDG 54 by determining the frequency difference between probe light 32 and the reflected probe light 32R, or measuring the wavelength separation between probe and pump. Simultaneous temperature and strain measurement at different locations along sensing optical fiber 50 can be evaluated simultaneous using BDG 54 by determining the frequency difference between probe light 32 and the reflected probe light 32R, and measuring the wavelength separation between probe and pump. Because of the narrow spectral bandwidth of BDG 54, high-resolution sensing can be achieved. Meanwhile, since probe light 32 can have a relatively short pulse width, a high spatial resolution is obtained.

Spatial Resolution

The distance Z from input/output end 52 of sensing optical fiber 50 to the position where probe light 32 is reflected is given by:

$$Z = \frac{ct}{2n_g} \quad (5)$$

where t is the time between launching the probe light 32 and receiving the reflected probe light 32R, $n_g$ is the group index of the guided mode of sensing optical fiber 50 into which the probe light 32 is launched, and c is the light speed in vacuum.

The spatial resolution $\Delta Z$ is determined by the probe light pulse width $\tau$:

$$\Delta Z = \frac{c}{2n_g}\tau \quad (6)$$

A probe light pulse width of $\tau$=100 ns corresponds to a spatial resolution of $\Delta Z$=10 m. To get a spatial resolution of less than 1 m, the probe light pulse width t should be less than 10 ns. In various embodiments, the probe light pulse width t is less than 5 ns and is less than 1 ns. In various embodiments, the probe light pulse width is between 0.1 ns to 5 ns and is between 0.1 ns to 1 ns.

In a second embodiment that employs counter-propagating pump light 22 and 22', the two pump light beams comprise short pump-light pulses selected to generate a stable BDG 54 having a broadband Brillouin gain (i.e., a broadband BDG 54) at the place where two short counter-propagating pump pulses overlap in the time domain.

The distance of this location from input/output end 52 of sensing optical fiber 50 is:

$$Z = \frac{1}{2}\left[L + \frac{c\Delta t}{n_g}\right] \quad (7)$$

where $\Delta t$ is the time delay between launching the pump-light pulses 22 and 22'. The spatial resolution $\Delta Z$ is determined by the pulse width $\tau_s$ of the longer pump pulse:

$$\Delta Z = \frac{c}{2n_g}\tau_s \quad (8)$$

Probe light 32 with a narrow spectral bandwidth can be used to determine temperature and strain at different locations. The measured spectrum of reflected probe light 32 is the convolution of the probe light spectrum and the BDG reflection spectrum. This allows narrow-linewidth probe light 32 to be used to obtain a narrow spectral width of the measured spectrum reflected probe light 32R, which enables a relatively high degree of measurement sensitivity of temperature or strain. Therefore, a high spatial resolution $\Delta Z$ and a high degree of measurement sensitivity can be obtained simultaneously using the systems and methods disclosed herein.

In practice, the spatial resolution $\Delta Z$ is a function of the sensing distance Z (i.e., the distance from input/output end 52 of sensing optical fiber 50). Table 1 below lists example sensing distances Z along with the corresponding spatial resolution $\Delta Z$ that can be obtained using the systems and methods described herein.

TABLE 1

Sensing distance Z and spatial resolution $\Delta Z$

| Z (km) | $\Delta Z$ (mm) |
|---|---|
| 25 | 30 |
| 10 | 15 |
| 1 | 5 |

Evolution of Robe Power and Reflected Probe Power

The evolution of the optical power of the pump light 22 and reflected probe light 32R can be obtained by solving the nonlinear Maxwell equations. The results show that the power changes are related to design parameters of sensing optical fiber 50 through a factor F. The factor F is related to efficiency of interaction between the pump light, the probe light, and the acoustic wave and is defined by:

$$F = \sqrt{\frac{A_{\mathit{eff}}^{pp} \cdot A_{\mathit{eff}}^{ss}}{\overline{I}_u^{pp} \cdot \overline{I}_u^{ss}}} \quad (9)$$

where $\overline{I}_u^{pp}$ and $\overline{I}_u^{ss}$ are the overlap integrals (pump light with the acoustic field and probe light with the acoustic field, respectively) defined by $$\overline{I}_u^{pp} = \frac{\left(\int\int E_0 \rho_u^* E_0^* r dr d\theta\right)^2}{\int\int (E_0 E_0^*)^2 r dr d\theta \cdot \int\int \rho_u \rho_u^* r dr d\theta} \quad (10)$$

$$\overline{I}_u^{ss} = \frac{\left(\int\int E_s \rho_u E_s^* r dr d\theta\right)^2}{\int\int (E_s E_s^*)^2 r dr d\theta \cdot \int\int \rho_u \rho_u^* r dr d\theta} \quad (10a)$$

$A_{\mathit{eff}}^{pp}$ and $A_{\mathit{eff}}^{ss}$ are the respective optical effective areas for pump and probe $$A_{\mathit{eff}}^{pp} = \frac{\left(\int\int E_0 E_0^* r dr d\theta\right)^2}{\int\int (E_0 E_0^*)^2 r dr d\theta} \quad (11)$$

$$A_{\mathit{eff}}^{ss} = \frac{\left(\int\int E_s E_s^* r dr d\theta\right)^2}{\int\int (E_s E_s^*)^2 r dr d\theta} \quad (11a)$$

In the above equations, $E_0$ and $E_S$ are the electrical fields of the pump light 22 and probe light 32, respectively, $\rho_u$ is the acoustic field generated by the pump light, and the symbol * denotes the complex conjugate of the fields. The factor F (also referred as the F factor herein) shows how the fibers design impacts the power propagation of probe light 32 and reflected probe light 32R, and can be used to optimize the design of sensing optical fiber 50 for a particular sensing application. Generally speaking, a smaller value of F means more effective interactions between BDG 54, pump light 22 and probe light 32.

To improve the F factor, one can reduce the effective areas of pump and probe, or increase the overlap integral. However, applicants found that if the effective area of probe is too small, the nonlinear effect of self-phase modulation becomes important, which can limit the amount of probe power can be used. Applicants discovered that it is possible (and desirable) to have a large effective area of probe while increasing the overlap integrals between the LP01 and fundamental acoustic mode L01. Applicants also discovered, that surprisingly when the overlap between the LP11 optical mode and the fundamental acoustic mode L01 increases (e.g., to 0.5 or higher), the fiber performance for BOTDR applications is greatly improved. Thus, the fiber core of the sensing optical fiber 50 is preferably designed to improve the overlap between the LP11 mode and the fundamental acoustic mode. For example, an embodiment of a sensor fiber 50, with a few moded "ring-shaped" core profile (outer portion of the few-moded core having greater refractive index than the inner core portion) performs much better than a fiber with a few moded core that has a step index profile (such as the one shown in FIG. 6A). Preferably the F factor of the sensing optical fiber 50 is 100 to 350 $\mu m^2$, for example 150 $\mu m^2 \leq F \leq 350$ $\mu m^2$.

Figure 6A:
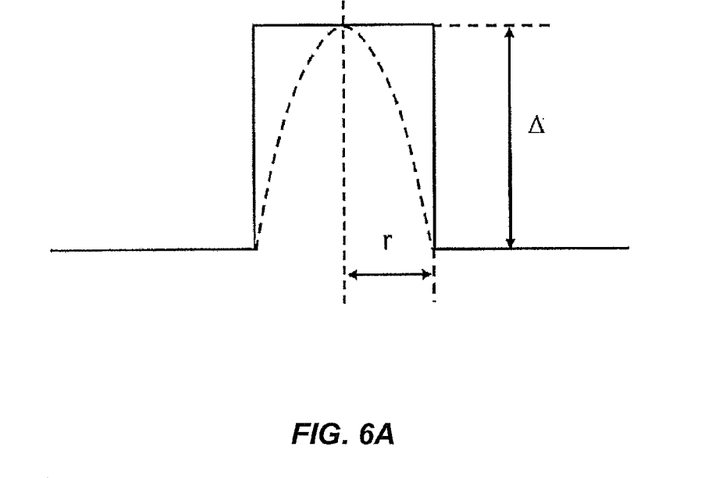
FIG. 6A is a schematic refractive index profile of a comparison sensing optical fiber.

More specifically, a few moded fiber with a simple step index core profile shown in FIG. 6A has a large overlap between the fundamental optical mode LP01 and fundamental acoustic mode. However the overlap between the LP11 optical mode and the fundamental acoustic mode (L01) is limited to about 0.4. Surprisingly, few moded fibers with the overlap integrals (between the LP11 guided optical mode and the fundamental acoustic guided mode) of 0.45 and higher perform much better than the fibers with lower overlaps between the LP11 optical (probe) mode and the fundamental acoustic mode. For example, we have found that the optical sensing fibers 50 with an overlap integral between the LP11 optical mode and the acoustic L01 mode of 0.5 performs about 20% to 30% better than a similar fiber with a step index design, and that 0.6 or greater overlap integral between the LP11 probe and the acoustic L01 mode provides about 50% or greater improvement over that of the step index profile multimode (MM) fiber design. Such high overlap integrals integral between the LP11 optical mode and the acoustic L01 mode result in higher DBG efficiency, and thus better BOTDR system performance.

Example Designs for Sensing Optical Fiber

In an example, sensing optical fiber 50 is configured to support two or more guided modes by increasing the cutoff wavelengths of the higher-order guided modes. In these embodiments the sensing optical fiber 50 is constructed to maximize the overlap integral between the LP11 mode and L01 acoustic mode. For example, in the fibers 50 with refractive index profiles shown in FIG. 6B, the overlap integral between the LP11 mode and L01 acoustic mode is greater than 0.5, and preferably greater than 0.6, which results in high DBG efficiency. Preferably, in these embodiments the effective area of both LP01 and LP11 mode is greater than 120 $\mu m^2$ at 1550 nm. In addition, in the following embodiments the overlap integral between the fundamental optical mode LP01 and fundamental (LP01) acoustic mode of sensing optical fiber 50 at least 0.7, preferably 0.75 or greater, and most preferably 0.8 or greater. Applicants discovered that achieving large overlap integrals between the optical pump, probe and acoustic modes, is advantageous because it improves the BOTDR efficiency. In addition, large effective area Aeff of the fundamental mode (LP01) and in LP11 mode at 1550 nm helps to reduce undesired nonlinear effect.

Figure 6B:
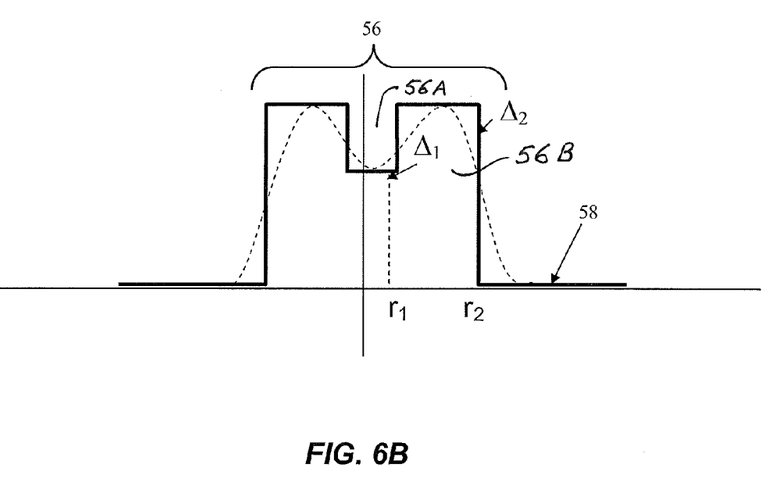
FIG. 6B illustrates schematically two exemplary refractive index profiles for embodiments of the sensing optical fiber.

FIG. 6B is a schematic diagram of example refractive index profiles for sensing optical fiber 50. Sensing optical fiber 50 includes a core 56 and a cladding 58. The core 56 is a segmented core and includes at least two segments 56A and 56B. More specifically, in the embodiment shown in FIG. 6B the inner core segment 56A has a maximum refractive index delta $\Delta_1$ and the outer radius $r_1$, and the outer core segment 56B has a maximum refractive index delta $\Delta_2$ and the outer radius $r_2$, and $\Delta_1 < \Delta_2$ Preferably $\Delta_1$ is between 0 to 0.4%, more preferably between 0 to 0.3%, relative to the cladding 58. The relative refractive index delta ($\Delta_2$) of the outer core segment 56B is between about 0.2 to 1% (for example, $0.2\% \leq \Delta_2 \leq 0.6\%$), relative to the cladding 58; more preferably between 0.3 to 0.5% (i.e., $0.3\% \leq \Delta_2 \leq 0.5\%$). The outer core radius $r_2$ is preferably between 4 to 20 $\mu m$, more preferably 5 to 10 $\mu m$, more preferably 6 to 9 $\mu m$, and even more preferably 6.5 to 8.7 $\mu m$, while the inner core radius $r_1$ is, for example, between 0.3 to 6 $\mu m$, for example 0.3 to 3 $\mu m$. Preferably, in sensing optical fiber 50, the difference between refractive index deltas between the two portions of the core is $\Delta_2 - \Delta_1 > 0.05\%$, for example $0.05\% \leq \Delta_2 - \Delta_1 \leq 1.0\%$. In the following exemplary embodiments $\Delta_2 - \Delta_1 > 0.15\%$, for example $0.15\% \leq \Delta_2 - \Delta_1 \leq 0.55\%$. Preferably, 3 $\mu m \geq r_2 - r_1 \geq 9$ $\mu m$.

The core 56 may be Ge doped. A desired number of guided optical modes can be supported by the core 56 with a properly chosen value for $\Delta_1$, $\Delta_2$ and a radii $r_1$ and $r_2$ of the core. Table 2 below shows eight design examples. In these embodiments the overlap between the fundamental optical mode and the acoustic L01 mode is greater than 0.7, and the overlap between the optical LP11 mode and the acoustic L01 mode is greater than 0.5. (In these exemplary embodiments LP11 optical mode corresponds to the probe light, and the LP01 optical mode corresponds to the pump light. However, the LP01 optical mode can be used to propagate probe light, while LP11 optical mode propagates pump light). The effective area of both LP01 and LP11 optical modes is preferably greater than 120 $\mu m^2$. The F factor of the sensing optical fiber 50 of Table 2 is between 150 and 300 $\mu m^2$. In the optical fiber 50 embodiments of Table 2, $0.15\% \leq \Delta_2 - \Delta_1 \leq 0.55\%$ and 3.5 $\mu m \geq r_2 - r_1 \geq 8.5$ $\mu m$.

More specifically, Tables 2 below set forth a total of eight example designs for sensing optical fiber 50. The central core $\Delta$ is in the range of 0.0% to 0.3%, and the outer core delta is between 0.33 and 0.51%. In these embodiments the core outer radius ($r_2$) is between 7.5 to 8.5 microns. Examples 1 and 2 have three guided modes, while Examples 2-8 have two guided modes, LP01 and LP11. The overlap between the fundamental optical guided mode LP01 and the fundamental acoustic guided mode L01 is between 0.74 and 0.96 and the overlap between the LP11 guided optical mode and the fundamental acoustic guided mode L01 is about 0.5 and 0.65 for all the examples in Table 2. In these examples the LP01 guided optical mode is used to guide pump light 22, and the probe light 32 is guided by the LP11 guided optical mode (but can also be guided by LP02, and/or LP21 guided optical modes. (Alternatively, the LP01 guided optical mode can be used to guide probe light, and the pump light can be guided by the LP11 (but can also be guided by LP02, and/or LP21 guided modes.) If a combination of the higher-order guided modes is used to carry probe light 32, the reflected probe light 32R will have multiple peaks at different wavelengths.

TABLE 2

Parameters of eight fiber design examples

| | Example # | | | | | | | |
|---|---|---|---|---|---|---|---|---|
| | 1 | 2 | 3 | 4 | 5 | 6 | 7 | 8 |
| $\Delta_1$ (%) | 0 | 0 | 0 | 0 | 0 | 0 | 0.3 | 0.3 |
| $\Delta_2$ (%) | 0.34 | 0.34 | 0.34 | 0.34 | 0.50 | 0.5 | 0.5 | 0.4 |
| $r_1$ (µm) | 0.42 | 0.84 | 1.26 | 2.1 | 1.9 | 4.0 | 1.7 | 2.7 |
| $r_2$ (µm) | 8.4 | 8.4 | 8.4 | 8.4 | 7.6 | 8 | 6.8 | 7.6 |
| Number of modes at 1550 nm | 3 | 3 | 2 | 2 | 2 | 2 | 2 | 2 |
| LP11 cutoff (µm) | 2.5972 | 2.5969 | 2.5953 | 2.5849 | 2.8275 | 2.8109 | 2.5472 | 2.5343 |
| LP02 cutoff (µm) | 1.6328 | 1.5983 | 1.5483 | 1.4162 | 1.5528 | 1.1388 | 1.5194 | 1.5141 |
| MFD @ 1550 nm (µm) | 14.2 | 14.2 | 14.2 | 13.9 | 12.0 | 11.0 | 11.7 | 13.1 |
| LP01 Aeff @ 1550 nm (µm$^2$) | 178 | 187 | 198 | 221 | 175 | 226 | 131 | 166 |
| LP01 Dispersion @ 1550 nm (ps/nm/km) | 22.1 | 22.0 | 21.8 | 20.9 | 20.5 | 16.2 | 21.8 | 21.9 |
| LP01 Slope @ 1550 nm (ps/nm2/km) | 0.0648 | 0.0651 | 0.0654 | 0.0660 | 0.0665 | 0.0686 | 0.0654 | 0.653 |
| Pump mode | LP01 | LP01 | LP01 | LP01 | LP01 | LP01 | LP01 | LP01 |
| Probe mode | LP11 | LP11 | LP11 | LP11 | LP11 | LP11 | LP11 | LP11 |
| $\bar{I}_u^{pp}$ | 0.960 | 0.928 | 0.923 | 0.900 | 0.911 | 0.893 | 0.836 | 0.748 |
| $\bar{I}_u^{ss}$ | 0.524 | 0.574 | 0.599 | 0.636 | 0.648 | 0.628 | 0.630 | 0.644 |
| Aeff pump mode (µm$^2$) | 178 | 187 | 198 | 221 | 175 | 226 | 131 | 166 |
| Aeff probe mode (µm$^2$) | 176 | 177 | 177 | 178 | 135 | 153 | 118 | 149 |
| F factor (µm$^2$) | 250 | 249 | 252 | 262 | 200 | 248 | 171 | 226 |

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present disclosure without departing from the spirit and scope of the same. Thus, it is intended that the present disclosure cover the modifications and variations of this disclosure provided they come within the scope of the appended claims and their equivalents.

We claim:

1. A sensing optical fiber comprising:
a few-moded multi-segment core, said core comprising one core segment surrounded by another core segment, and at least one cladding surrounding said core; said core having an F factor (µm$^2$) of 100 µm$^2$ to 350 µm$^2$, and is constructed to provide (i) an overlap integral between the fundamental optical guided mode and the fundamental acoustic guided mode of greater than 0.7 and (ii) the overlap integral between the LP11 optical guided mode and the fundamental acoustic guided mode at least 0.45.

2. A sensing optical fiber comprising:
a few-moded multi-segment core, said core comprising first core segment surrounded by another core segment, and at least one cladding surrounding said core; wherein the refractive index delta of said one core segment is lower than the refractive index delta of said another core segment, said core having a core radius of 4 µm≤r≤20 µm and F factor (µm$^2$) is 100 µm$^2$ to 350 µm$^2$ is constructed to provide (i) an overlap integral between the fundamental optical guided mode and the fundamental acoustic guided mode is greater than 0.7 and (ii) overlap integral between the LP11 optical guided mode and the fundamental acoustic guided mode of at least 0.45.

3. The sensing optical fiber of claim 2 wherein the overlap integral between the LP11 optical guided mode and the fundamental acoustic guided mode at least 0.5.

4. The sensing optical fiber of claim 3 wherein the overlap integral between the LP11 optical guided mode and the fundamental acoustic guided mode at least 0.6.

5. The sensing optical fiber according to claim 3, wherein an effective area Aeff≥100 µm$^2$ at 1550 nm for the LP01 optical mode.

6. The sensing optical fiber according to claim 5, wherein an effective area Aeff≥150 µm$^2$ at 1550 nm for the LP01 optical mode.

7. The fiber of claim 2 wherein the core radius is 4 µm to 10 µm, and the difference between the refractive index deltas of said core segments is $\Delta_2-\Delta_1>0.05\%$.

8. The fiber of claim 7 wherein the difference between the refractive index deltas of said core segments is $0.05\%\leq\Delta_2-\Delta_1\leq1\%$.

9. The fiber of claim 2 wherein said first core segment has a maximum refractive index delta $\Delta_1$ and said another core segment has a maximum refractive index delta $\Delta_2$ such that (i) $\Delta_1<\Delta_2$; (ii) $\Delta_1$ is between 0 to 0.5%, relative to the cladding; and (iii) $\Delta_2$ is between about 0.2 to 1%.

10. The fiber of claim 8 wherein said first core segment has a maximum refractive index delta $\Delta_1$ and said another core segment has a maximum refractive index delta $\Delta_2$ such that (i) $\Delta_1<\Delta_2$; (ii) $\Delta_1$ is between 0 to 0.4%, relative to the cladding; and (iii) $\Delta_2$ is between about 0.2 to 0.6%.

11. A distributed Brillouin optical fiber sensing system, comprising:
a sensing optical fiber of claim 1;
a pump light source configured to introduce pump light into one of the guided modes to define a pump light guided mode, the pump light forming a Brillouin dynamic grating (BDG); and
a probe light source configured to introduce input probe light into one or more of the guided modes other than the pump light guided mode to create reflected probe light from the BDG, with the reflected and input probe light shifted in frequency by a Brillouin wavelength shift.

12. A distributed Brillouin optical fiber sensing system, comprising:
a sensing optical fiber of claim 2;
a pump light source configured to introduce pump light into one of the guided modes to define a pump light guided mode, the pump light forming a Brillouin dynamic grating (BDG); and a probe light source configured to introduce input probe light into one or more of the guided modes other than the pump light guided mode to create reflected probe light from the BDG, with the reflected and input probe light shifted in frequency by a Brillouin wavelength shift.

13. A distributed Brillouin optical fiber sensing system, comprising:
   a sensing optical fiber of claim 8;
   a pump light source configured to introduce pump light into one of the guided modes to define a pump light guided mode, the pump light forming a Brillouin dynamic grating (BDG); and
a probe light source configured to introduce input probe light into one or more of the guided modes other than the pump light guided mode to create reflected probe light from the BDG, with the reflected and input probe light shifted in frequency by a Brillouin wavelength shift.

14. A distributed Brillouin optical fiber sensing system, comprising:
   a sensing optical fiber of claim 10;
   a pump light source configured to introduce pump light into one of the guided modes to define a pump light guided mode, the pump light forming a Brillouin dynamic grating (BDG); and
a probe light source configured to introduce input probe light into one or more of the guided modes other than the pump light guided mode to create reflected probe light from the BDG, with the reflected and input probe light shifted in frequency by a Brillouin wavelength shift; and
   a receiver optically coupled to the sensing optical fiber and configured to detect the reflected probe light to determine a Brillouin frequency shift and a reflection location of the probe light.

15. The optical fiber sensing system according to claim 12, further comprising the receiver being configured to determine at least one of temperature and strain in the sensing optical fiber as a function of distance along the sensing optical fiber.

16. A distributed Brillouin optical fiber sensing system, comprising:
   a sensing optical fiber configured to support at least first and second guided modes, said sensing fiber having a core constructed to provide (i) an the overlap integral between the fundamental optical guided mode and the fundamental acoustic guided mode is greater than 0.7 and (ii) overlap integral between the LP11 guided optical mode and the fundamental acoustic guided mode of at least 0.45;
   a first pump light source optically coupled to the sensing optical fiber and configured to generate first pump light that travels in the sensing optical fiber in the first guided mode and forms a Brillouin dynamic grating (BDG) that contains information of a local Brillouin frequency of the sensing optical fiber;
   a probe light source optically coupled to the sensing optical fiber and configured to generate pulsed probe light that travels in the sensing optical fiber in the second guided mode, with the pulsed probe light having a wavelength selected so that at least a portion of the pulsed probe light reflects from the Brillouin dynamic grating and includes information about the local Brillouin frequency and a probe-light reflection location; and
   a receiver optically coupled to the sensing optical fiber and configured to receive the reflected probe light and determine the local Brillouin frequency, the reflection location, and at least one condition along the sensing optical fiber.

17. The optical fiber sensing system according to claim 16, further comprising the first guided mode being a fundamental guided mode of the sensing optical fiber and the second guided mode being a higher-order guided mode of the sensing optical fiber.

18. The optical fiber sensing system according to claim 16, wherein the at least one condition includes at least one of temperature and strain as a function of distance from an input/output end of the sensing optical fiber.

19. The optical fiber sensing system according to claim 18, further comprising sensing the at least one condition with a spatial resolution $\Delta Z$ in the range $1\ cm \leq \Delta Z < 1\ m$.

20. The fiber of claim 8 wherein the difference between the refractive index deltas of said core segments is $0.15\% \leq \Delta_2 - \Delta_1 \leq 0.55\%$.

* * * * *